United States Patent [19]

Economy

[11] Patent Number: 5,439,541
[45] Date of Patent: Aug. 8, 1995

[54] METHOD FOR PRODUCING AND USING CROSSLINKED COPOLYESTERS

[75] Inventor: James Economy, Urbana, Ill.

[73] Assignee: The Board of Trustees of the University of Illinois, Urbana, Ill.

[21] Appl. No.: 193,561

[22] Filed: Feb. 8, 1994

[51] Int. Cl.⁶ ............................................. B32B 31/00
[52] U.S. Cl. ................................. 156/182; 156/307.5; 156/332; 428/420; 428/482; 528/302
[58] Field of Search ...................... 156/182, 307.5, 332; 428/420, 482; 528/302

[56] References Cited

U.S. PATENT DOCUMENTS

| | | |
|---|---|---|
| 2,691,006 | 10/1954 | Flory ........................... 528/302 |
| 3,637,595 | 1/1972 | Cottis et al. . |
| 3,644,593 | 2/1972 | Nowak et al. . |
| 3,652,355 | 3/1972 | Herrick ........................ 156/182 |
| 3,698,982 | 10/1972 | Griffin ......................... 156/182 |
| 4,362,777 | 12/1982 | Miller . |
| 4,408,022 | 10/1983 | Cincotta et al. . |
| 4,429,078 | 1/1984 | Cogswell et al. . |
| 4,560,594 | 12/1985 | Cobbs, Jr. . |
| 4,683,327 | 7/1987 | Stackman . |
| 4,710,547 | 12/1987 | Uryu et al. . |
| 4,715,919 | 12/1987 | Fakirov et al. . |
| 4,737,398 | 4/1988 | Ikenaga et al. . |
| 4,755,431 | 7/1988 | Fakirov et al. . |
| 4,802,061 | 1/1989 | Portugall et al. . |
| 4,833,022 | 5/1989 | Bridges et al. . |
| 4,863,767 | 9/1989 | Garg et al. . |
| 4,963,428 | 10/1990 | Harvey et al. . |
| 4,966,807 | 10/1990 | Harvey et al. . |

FOREIGN PATENT DOCUMENTS 2179357A 3/1987 United Kingdom .

OTHER PUBLICATIONS

Canessa et al., Structure-Property Relations in Linear and Crosslinked Liquid Crystalline Polymers, *Makromol. Chem., Macromol, Symp.*, 4:91–101, 1986.

Vaz et al., Polymer-Dispersed Liquid Crystal Films Formed by E-Beam Cure, *SPIE*, 1257:9–16, 1990.

*Primary Examiner*—John J. Gallagher
*Attorney, Agent, or Firm*—Dressler, Goldsmith, Shore & Milnamow, Ltd.

[57] ABSTRACT

This invention provides crosslinked copolyester adhesives, rigid foams, protective coating, matrices for composites and dielectric for electrical circuits, and methods for making crosslinked copolyester adhesives, rigid foams, protective coatings, matrices for composites and dielectrics for electrical circuits. Two or more adherends may be bonded together using a crosslinked copolyester adhesive by first combining at least one oligomer having carboxylic acid end groups with at least one oligomer having ester end groups, where at least one of the oligomers is branched, to form a mixture. Then, the mixture is applied to the adherends to be bonded and the mixture on the adherends is cured. Next, the adherends are positioned such that the cured mixtures contact and the contacted mixtures heated to form a bond between the cured mixtures.

6 Claims, 4 Drawing Sheets

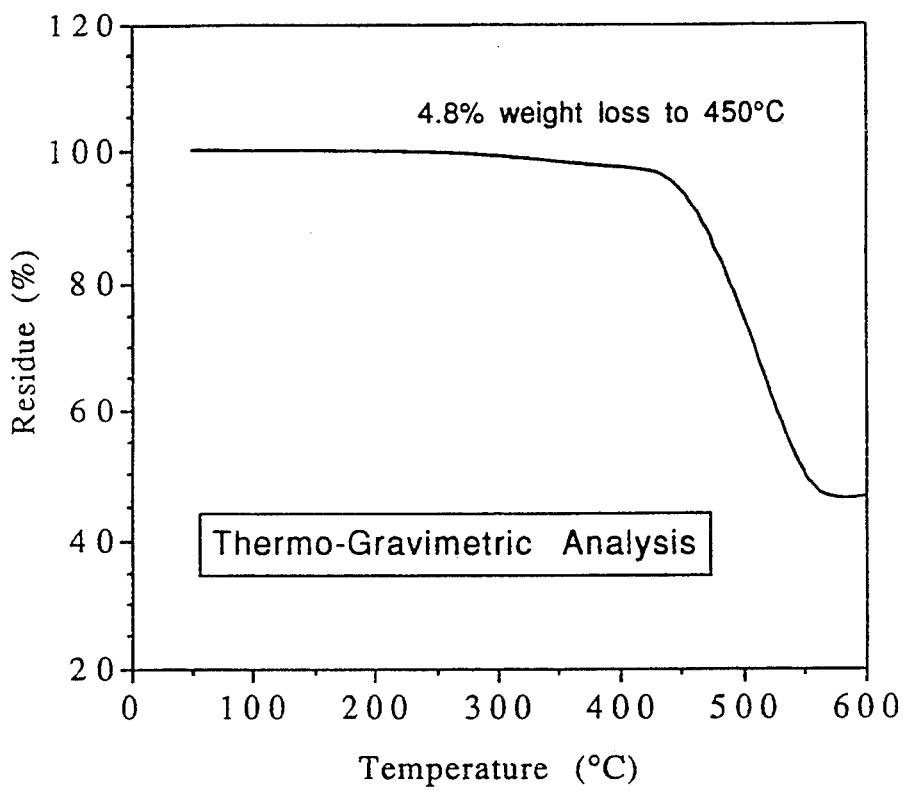
Fig. 1. Thermal stability of foam specimen heated in nitrogen atmosphere at 10°C/min.
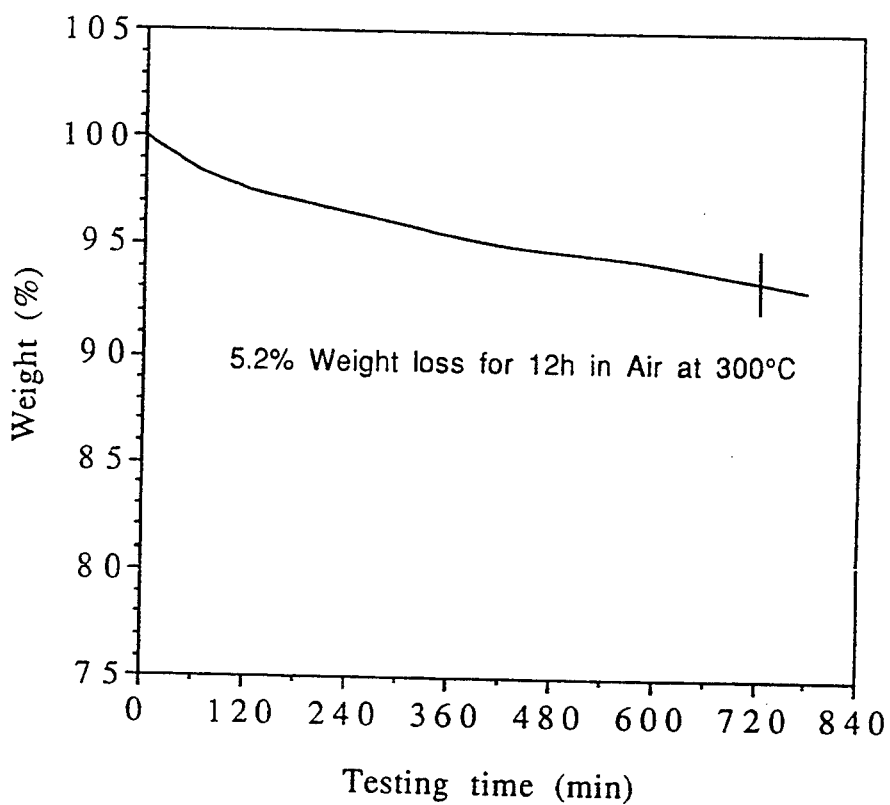
Fig. 2. TGA scan of foam specimen isothermally heated at 300°C in Air.

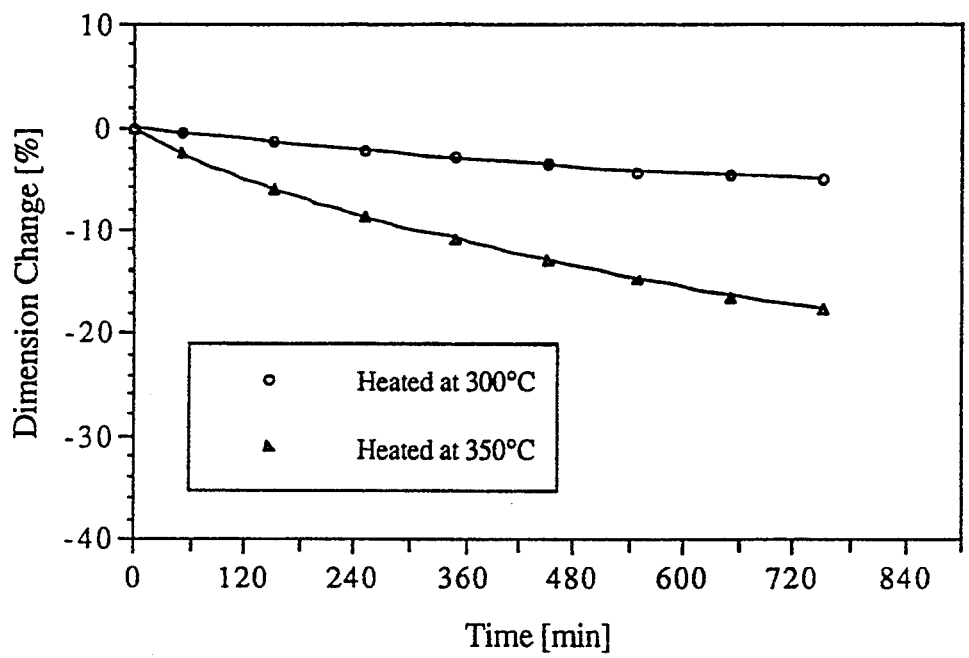
Fig. 3. Dimension change of small porous foam under load at elevated temperatures
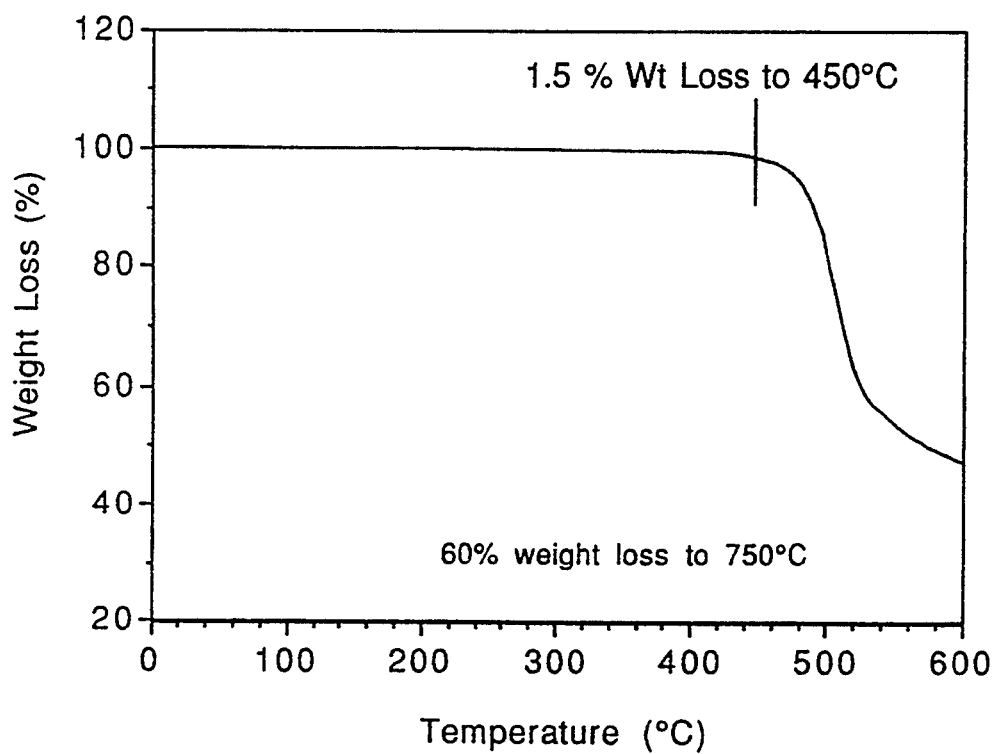
Fig. 4. TGA of an Aromatic Copolyester Resin Showing the High Thermal Stability.

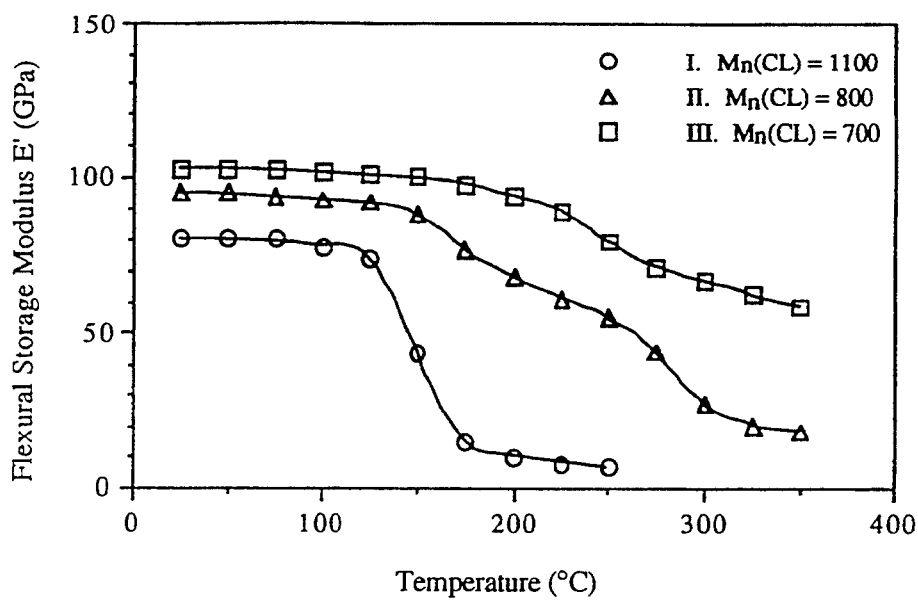
Fig. 5. DMA spectra of carbon fiber composites with an aromatic polyester matrix showing the effect of varying crosslink density Mn (cl).
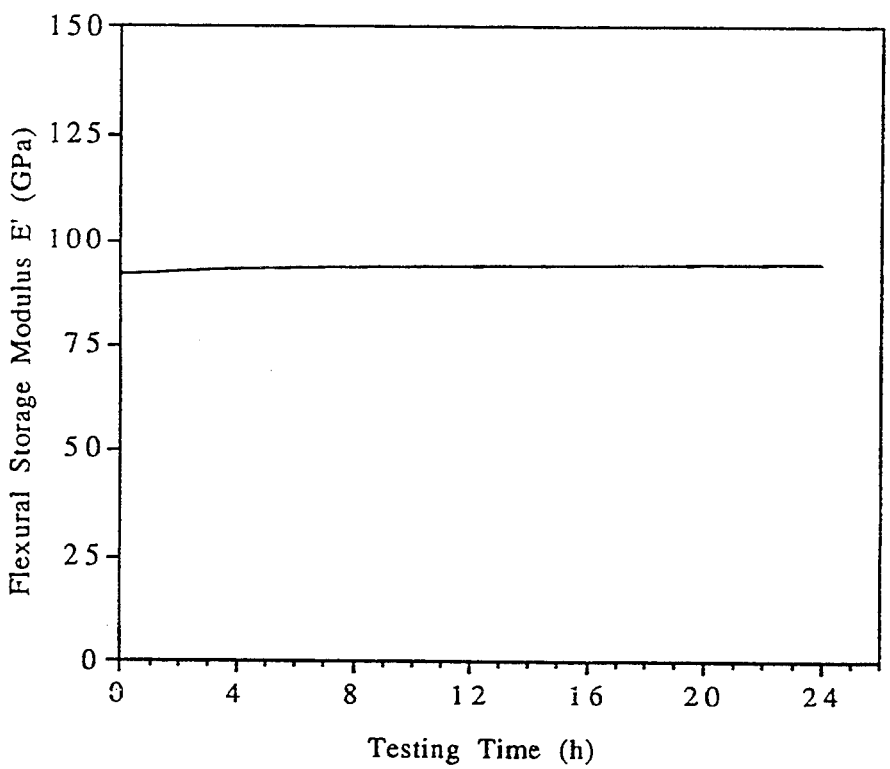
Fig. 6. DMA spectra of CF-composites with crosslinkable aromatic matrix - isothermal scan at 200°C for 24 hrs.

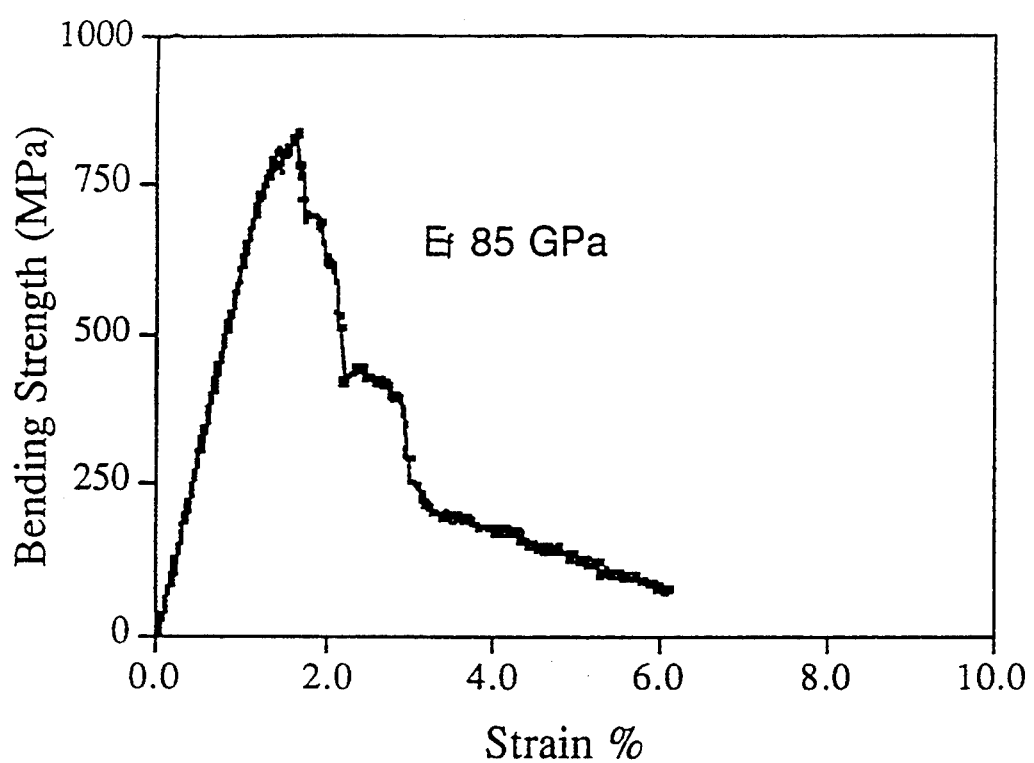
Fig 7. Stress-strain curve from a TPBT of CF-Composite with crosslinkable copolyester oligomer matrix

METHOD FOR PRODUCING AND USING CROSSLINKED COPOLYESTERS

This invention was made with governmental support from Contract No. N00014-91-J-1044 awarded by the Department of the Navy. The government has certain rights in the invention.

TECHNICAL FIELD

This invention relates to crosslinked copolyester adhesives, rigid foams, protective coatings, matrices for composites and dielectrics for electrical circuits. This invention also relates to methods for bonding adherends using crosslinked copolyesters, for making a composite having a crosslinked copolyester matrix, for making an electrical circuit having a crosslinked copolyester dielectric and for making crosslinked copolyester rigid foams and protective coatings.

BACKGROUND OF THE INVENTION

Traditionally, polymers have been used in applications such as adhesives, matrices for composites and dielectrics for electrical circuits. For example, epoxies were first introduced in the 1950's and are still used in matrices for composites and in adhesives. Similarly, polyimides were developed in the 1960's and are used in high temperature applications in the range of about 150° C. to about 340° C. Typically, epoxies have a thermal stability of up to 160° C. and therefore are not used in high temperature applications. Moreover, the epoxies and polyimides have a tendency to pick up moisture, have dielectric constants in the range of about 5.0 to about 3.3 and have poor corrosion resistance.

Polymers such as polyimides, polybenzimidazoles and polyquinoxalines have been the polymers of choice for high temperature applications. However, these polymers have drawbacks. For example, these polymers can be difficult to process because they require high curing temperatures and venting under a vacuum may be necessary to control the release of volatiles during the curing process. In addition, such polymers typically must be applied to a substrate after the substrate has been heated and, most preferably, after the substrate has been anodized. Moreover, some of these polymers may require additives that inhibit corrosion and a diluting solvent. In spite of the serious drawbacks associated with these polymers, no viable alternatives have emerged despite intense research.

While crosslinked copolyesters offer certain advantages, including the ability to withstand continuous use temperatures in air of 350° C., inertness to moisture, high strength and modulus values, outstanding dimensional stability, and low dielectric constants, crosslinked polyesters were not considered for use in adhesives, composites, rigid foams, protective coatings and as dielectrics because of various preconceptions. For example, one reason why polyesters have not been evaluated as potential adhesives is the observation that good adhesion between polymers can only be achieved if the polymer chains penetrate up to several hundred angstroms across the interface between two polymers. Presumably, the rod-like nature of many aromatic and aromatic-aliphatic polyesters would reduce the potential for chain entanglement, and thus not be conducive to good adhesion between two polyesters. This is particularly true in the case of liquid crystalline copolyesters. Moreover, the penetration of polymer chains in the case of crosslinked polyesters would be even less, as crosslinking creates a more structured three dimensional polymer, and crosslinked polymers are generally considered to be inert.

However, it has been unexpectedly found that good adhesion may be obtained between two crosslinked copolyesters because the copolyesters undergo interchain transesterification reactions at the interface between the two copolyesters.

The suitability of crosslinked copolyesters as substitutes for other polymers in composites, dielectrics and protective coatings was also not investigated, as no way to produce high density crosslinked copolyesters in situ was apparent in light of the known tendency of copolyesters to release volatiles upon crosslinking or curing. The released volatiles usually resulted in a foam or other low density composition that was not suitable for many applications.

SUMMARY OF THE INVENTION

This invention provides crosslinked copolyester adhesives, protective coatings, rigid foams, matrices for composites and dielectrics for electrical circuits. This invention also provides methods for making crosslinked copolyester adhesives, protective coatings, rigid foams, matrices for composites and dielectrics for electrical circuits.

To make a crosslinked copolyester dielectric for an electrical circuit, at least one oligomer having carboxylic acid end groups is combined with at least one oligomer having ester end groups, where at least one of the oligomers is branched, to form a crosslinkable mixture. Next, the mixture is cured to form a solid film on which metal circuitry is deposited by standard techniques such as lithography. After curing, subsequent layers of dielectric and metal circuitry may be applied to form a multilayered circuit. Alternatively, the circuit may be formed by stacking several layers of dielectric and metal circuitry and then heating the stack under pressure to adhere the dielectric copolyester layers to each other and to form metal interconnects between the layers to act as vias.

To make a crosslinked copolyester matrix for a composite, at least one oligomer having carboxylic acid end groups is combined with at least one oligomer having ester end groups, where at least one of the oligomers is branched, to form a crosslinkable mixture. Next, the mixture of oligomers is introduced into a fibrous substrate and the mixture cured to form a solid, crosslinked copolyester matrix.

To bond adherends together using a crosslinked copolyester, at least one oligomer having carboxylic acid end groups is combined with at least one oligomer having ester end groups, where at least one of the oligomers is branched to form a crosslinkable mixture. Next, the mixture is applied to the adherends to be bonded and the mixture cured. The adherends to be bonded are then positioned so that the cured mixtures contact and the cured mixtures are heated while in contact to form a bond.

BRIEF DESCRIPTION OF THE DRAWINGS

FIG. 1 is a plot showing the results of a thermo-gravimetric analysis of a crosslinked copolyester foam at a heating rate of 10° C./minute.

FIG. 2 is a plot showing the results of a thermo-gravimetric analysis of a crosslinked copolyester foam at a constant temperature of 300° C.

FIG. 3 is a plot showing the dimension change versus the time at 300° and 350° C./ for a crosslinked copolyester foam.

FIG. 4 is a plot showing the results of a thermo-gravimetric analysis of an aromatic copolyester.

FIG. 5 is a plot showing the flexural storage modulus versus the temperature at various crosslink densities of a carbon fiber composite made using aromatic copolyesters.

FIG. 6 is a plot showing the flexural storage modulus versus the testing time of a carbon fiber composite having a crosslinked aromatic matrix.

FIG. 7 is a plot showing the bending strength versus the strain of a carbon fiber composite having a copolyester matrix.

DETAILED DESCRIPTION OF THE PREFERRED EMBODIMENTS

In a first embodiment, the present invention provides a method for bonding adherends using a crosslinked copolyester as an adherent. For example, two or more oligomers are combined to form a crosslinkable mixture of oligomers. As used herein, the term "oligomer" shall mean a low molecular weight polymer having about 3, to about 25 monomer units. One of the oligomers of the mixture has carboxylic acid end groups and another of the oligomers of the mixture has ester end groups. The mixture of oligomers may comprise more than two oligomers and may have one or more oligomers having carboxylic acid end groups and one or more oligomers having ester end groups. The ester end groups may be selected from any ester group known in the art. Preferably, the ester end group is selected from the group consisting of $CH_3CO_2-$, $C_2H_5CO_2-$, $C_6H_5CO_2-$, $C_6H_5 CO_2-$, $(CH_3)_3Si-O-$, and $CH_3OCO_2-$. Preferably, the ester end group is selected so that any free acid that is formed during crosslinking and transesterification is volatile and is released from the mixture. If the acid is not volatile at the curing and transesterification temperatures, then the resulting free carboxylic acid may react again with the crosslinked polyester mixture and affect the crosslink density. Typically, when a crosslinked polyester is used as an adhesive, the released carboxylic acid should not decrease the bond strength of the adhesive or be toxic. Most preferably, the released organic acid is acetic acid.

To produce a crosslinked copolyester, one of the oligomers must be branched. That is, one of the oligomers must have more than two functional end groups. For example, the carboxylic acid oligomer may be branched and contain three or more carboxylic acid end groups. Alternatively, one of the oligomers having ester end groups may be branched and have three or more ester end groups.

The oligomers may be homopolymers. Alternatively, the oligomers may be copolymers, for example, branched, graft, linear, alternating or block copolymers. In addition, if the oligomer has stereocenters, the stereocenters may have the same absolute configuration, a random configuration, an alternating configuration or any other variation thereof. Monomers from which the above oligomers may be made include, but are not limited to, hydroxybenzoic acid, hydroxynaphthoic acid, hydroquinone, isophthalic acid, terephthalic acid, biphenol, trimesic acid, trimelletic acid, adipic acid, ethylene glycol, hydroquinone diacetate, acetoxybenzoic acid, acetoxynaphthoic acid and diacetoxybiphenol.

Adherends may be bonded together using a crosslinked copolyester. As used herein the term "adherend" shall mean any material that is desired to bond to one or more other materials. As used herein the word "bond" shall mean to hold together.

To bond adherends using a crosslinked copolyester, at least one oligomer having carboxylic acid end groups is combined with at least one oligomer having ester end groups, where at least one of the oligomers is branched, to form a crosslinkable mixture.

Next, the mixture of oligomers is applied to the adherends to be bonded together. The mixture, which has been coated on at least a portion of the adherends, is then cured by heating the mixture for a time and at a temperature sufficient to solidify the mixture and crosslink the component oligomers.

The time and temperature for curing may be selected by those skilled in the art using no more than trial and error. The exact curing time and temperature for a particular oligomer mixture will depend on the composition of the mixture. For example, a mixture comprising oligomers made from aromatic monomers may require a higher curing temperature than a mixture of oligomers made from part aromatic monomers and part aliphatic monomers. Similarly, a mixture comprising aliphatic oligomers will typically require a lower curing temperature than a mixture composed of either all aromatic oligomers or a mixture of aromatic and aliphatic oligomers. Generally, in the curing process, the different oligomers undergo further polymerization to higher molecular weight polymers and then crosslinking occurs. Part of the curing process may also be considered to be an interchain transesterification reaction.

After curing, the mixture is a solid crosslinked copolyester. To bond two adherends, at least a portion of the adherends are coated with the oligomer mixture, which is cured. The adherends are then contacted so that at least a portion of the cured mixtures contact. Then, the contacted cured oligomers are heated to a temperature such that the two crosslinked copolyesters (cured mixture) undergo interchain transesterification and become bonded to each other. Generally, the temperature used to achieve interchain transesterification is higher than the curing temperature. It may be preferable to apply pressure to the adherends so that the surfaces of the copolyesters make better contact. During this bonding step, essentially no volatiles are emitted. It is also contemplated that more than two adherends may be bonded using the above method. It is also recognized that a thin film of the oligomeric mixture, either cured or uncured, could be positioned between the surfaces of two cured oligomeric coatings to provide for better bonding, or bonding may be improved by the introduction of a catalyst to at least one surface of the cured oligomeric coatings that will be contacted to form a bond. Various catalysts that aid in bond formation are described below.

Another embodiment of this invention is a method for producing a dielectric for an electrical circuit. To make a dielectric for an electrical circuit, at least one oligomer having carboxylic acid end groups is combined with at least one oligomer having ester end groups to form a crosslinked mixture. At least one oligomer of the mixture must be branched so that it has three functional end groups. The various oligomer mixtures that were described above in the context of adhesives may also be employed in the production of a dielectric. The oligomer mixture may be coated on a substrate, cured and a conductor layer or pattern subsequently applied. Typically, the oligomers are solids, which may be ground to a finely divided powder. To make an oligomer mixture, the desired amount of each oligomer is combined, and the solid mixture is heated to its melting point, but below the curing temperature of the mixture. The melt may be homogenized by mixing and the homogeneous liquid mixture may be applied to the desired substrate.

In certain electronic circuits, more than one layer of circuitry is desired. The present invention provides a way of making a multilayered electronic circuit that uses crosslinked polyesters as a dielectric between the layers of circuitry. For example, a first crosslinked copolyester dielectric layer may be applied and cured. Then, a circuit layer is applied to the surface. Next, a second dielectric layer may be applied over the circuit layer and so on until the desired number of layers is obtained. Once all the multilayered circuits have been formed, it may be desirable to firmly bond the dielectric layers together and thus the multilayer circuit may be heated to a temperature higher than the curing temperature such that interchain transesterification occurs between the dielectric layers of the circuit. Alternatively, a multilayered electrical circuit may be formed by stacking several layers of dielectric and metal circuitry and then heating the stack under pressure to adhere the dielectric copolyester layers to each other and to form metal interconnects between the layers to act as vias.

It is contemplated that the dielectric may be localized or may form a layer between stacked circuits with a connection between the various stacked circuits. Dielectric layers comprised of crosslinked copolyesters can have dielectric constants as low as 3.0 and may approach 1 if the dielectric layer is in the form of a foam, which may be obtained upon rapid heating during curing.

A third embodiment of the present invention is a method of making a composite having a solid, crosslinked copolyester matrix. To make a composite having a crosslinked copolyester matrix, at least one oligomer having carboxylic acid end groups is combined with at least one oligomer having ester end groups. In this mixture, at least one of the oligomers in the mixture must be branched and have at least three end groups. The mixtures of oligomers described above for adhesives may be used in the manufacture of composites.

The mixture of oligomers is then introduced into a fibrous substrate. As used herein the term "fibrous substrate" shall mean materials that are porous and may be impregnated with a liquid such as the oligomer mixtures. For example, some of the common fibrous substrates used in composites include carbon, glass and ceramic fibers. Next, the mixture is cured to form a solid, crosslinked copolyester matrix.

The adhesives, matrices and dielectrics made according to the present invention consist essentially of a crosslinked copolyester. Thus, the adhesives, matrices and dielectric have for a major component, usually in the greatest quantity with respect to any other components, a crosslinked polyester.

In general, the form of the resulting cured mixtures can depend on the curing time and temperature. For example, if a foam is desired, a high curing temperature for a short period of time may be used, as the volatiles produced in the curing step are rapidly given off and become trapped in the quickly solidifying mixture. However, for most applications, a foam is not desired and may be avoided by curing the combination at a lower temperature for a longer time. The lower temperature allows the mixture to remain a viscous fluid longer, which more easily releases volatiles. Also, at lower temperatures, volatiles are not produced as rapidly.

Another embodiment of the invention includes rigid foams or structural foams. Such foams may be used in building, such as the construction of homes. Foams made from crosslinked copolyesters have the advantage that they are more resistant to high temperatures. Structural foams may be used as the matrix of a building material. For example, a building material that includes a structural foam can have a board like shape such as that of gypsum board or dry wall. Typically, such as structural material would have two opposing solid outerskins made of a material such as wood or cardboard or the like and the center would comprise a crosslinked copolyester foam of the present invention. Structural foams can also be used for insulation and other applications, including but not limited to, appliances, business machines, consumer electronics and furniture.

It is also recognized that the oligomers used in the mixture may be liquid crystalline oligomers and that the resulting crosslinked copolyester may have certain advantages associated with liquid crystalline properties.

The particular oligomer mixture to be used will depend on the desired use of the crosslinked copolyester. For example, if stability to high temperatures is desired, as is true in many aerospace adhesive applications, oligomers made from aromatic monomers are preferred.

In each of the embodiments disclosed above a catalyst that promotes interchain transesterification may be used. A few nonlimiting examples of catalysts that may be used include titanium oxides, aluminum oxides and other oxides, usually starting with an alkoxide ester to facilitate dissolution. Another catalyst that may be used is sodium acetate. The examples presented below are intended to further illustrate the invention and are in no way intended to limit the scope of the specification or the claims.

EXAMPLES

Example 1

Crosslinked Copolyester Adhesives and Coatings

Low molecular weight oligomers with liquid crystalline character can be synthesized from monomers to yield all aromatic or mixed aliphatic and aromatic oligomers. For example, oligomers may be composed of, but not limited to, the following monomers: hydroxybenzoic acid, hydroxynaphthoic acid, hydroquinone, isophthalic acid, terephthalic acid, biphenol, trimesic acid, trimelletic acid, adipic acid and ethylene glycol. In order to provide for crosslinking of a mixture of two or more oligomers, at least one of the oligomers of the crosslinkable mixture must be branched.

Aromatic Oligomer Mixture

The structures below show two aromatic oligomers that, when combined, form a crosslinkable mixture of oligomers:

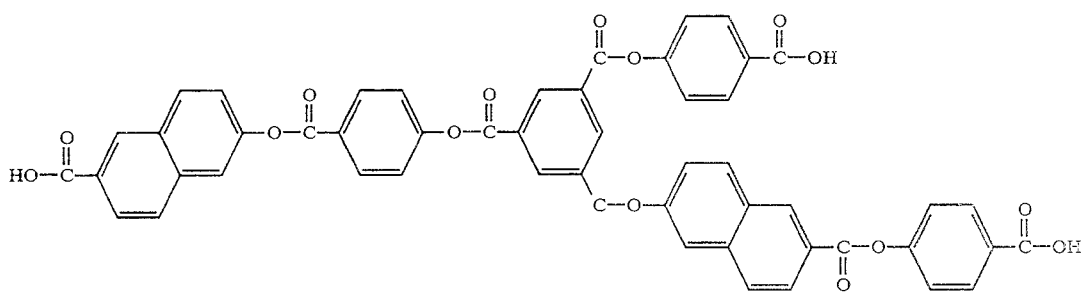

Branched Oligomer

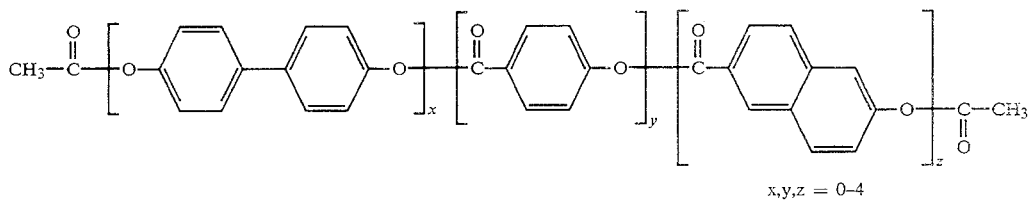

x,y,z = 0–4

Linear Oligomer

The branched oligomer may be prepared by reacting trimesic acid, 4-acetoxybenzoic acid and 6-acetoxy-2-naphthoic acid in Therminol 66, which is a heat transfer fluid made of hydrogenated terphenyls that boils at 343° C. Therminol 66 may be purchased from the Monsanto Company, St. Louis, Mo. The acetoxy monomers can be made by acetylation of the corresponding hydroxy monomers. See, for example, Chattaway in *Journal of the Chemical Society*, part III, p. 2495, (1939), hereby incorporated by reference.

Specifically, 1 g of trimesic acid, 2.57 g of acetoxybenzoic acid and 3.28 g of 6-acetoxy-2-naphthoic acid were mixed in a 100 ml 3-necked flask containing 50 ml of Therminol 66. A collection flask was connected to one neck in order to collect released acetic acid and to measure the extent of the reaction based on the collected acetic acid. A thermometer and argon gas inlet were connected to the other two necks, and the reaction was carried out under a constant argon flow. The reaction was begun by immersing the flask in a salt bath preheated to 180° C. (The salt bath as used in this example is a mixture of potassium and sodium nitrite.) Then, the temperature of the salt bath was raised over 35 minutes to 325° C.

To make the linear oligomer, 1.62 g of acetoxybenzoic acid, 2.12 g of 6-acetoxy-2-naphthoic acid and 2.5 g of 4,4-diacetoxybiphenyl were added to a 50 ml 3-necked flask in an argon atmosphere. The flask was immersed in a salt bath that was preheated to 180° C., and the temperature of the salt bath was raised to 320° C. over one hour.

Aliphatic/Aromatic Oligomer Mixture

An aliphatic/aromatic crosslinkable oligomer mixture having the oligomers show below was also prepared.

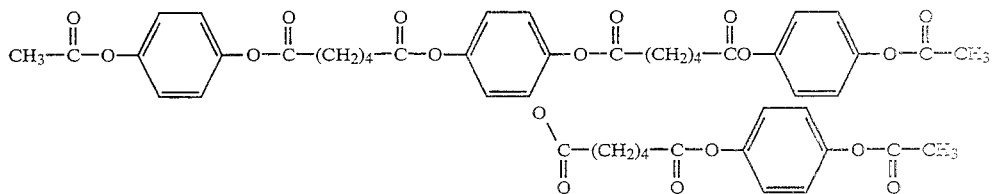

Branched oligomer

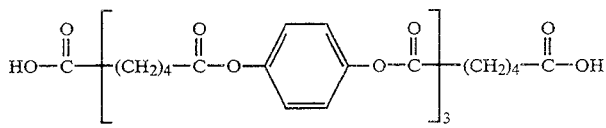

Linear Oligomer

The branched oligomer was prepared by combining 8.77 g of adipic acid and 5.04 g of 1,2,4-triacetoxybenzene in a 50 ml 3-necked flask. The three necks provided for an argon inlet, a thermometer and attachment of a distillation head to measure and collect the acetic acid released, and the reaction was carried out under argon. The flask and contents were immersed in a salt bath that was preheated to 210° C., and then the temperature of the salt bath was raised to 225° C. over 30 minutes. After 90 minutes at 225° C., no more acetic acid was collected and the flask was removed from the salt bath and allowed to cool to room temperature. 11.65 g of hydroquinone diacetate was added to the ples of proper dimension were machined and lap shear strength testing was done using an Instron or MTS tensile testing machine. The results of these tests are shown in Table 1 below.

TABLE 1

| Oligomer Mixture | Curing Conditions | | Laminating Conditions | | | Lap Shear Strength | | |
|---|---|---|---|---|---|---|---|---|
| | T(°C.) | Time (min) | T(°C.) | Time (min) | Pressure (in. of Hg) | 25° C. | 100° C. | 200° C. |
| arom. | 325 | 0 | 400 | 0.17 | 700 | 1184 | | 299 |
| arom. | 325 | 15 | 400 | 0.17 | 700 | 1180 | | 383 |
| ali./arom. | 240 | 60 | 240 | 180 | 1700 | 1580 | 1080 | |
| ali./arom. | 240 | 60 | 220 | 180 | 1700 | 2480 | 960 | | arom. is an oligomeric mixture having all aromatic oligomers.
ali./arom. is an oligomeric mixture having both aliphatic and aromatic oligomers.

cool flask along with 76.4 mg of zinc acetate and 16.6 mg of antimony trioxide, both of which act as catalysts for the reaction and subsequent crosslinking. The flask was then immersed in a salt bath at a temperature of about 225° C. for 3 hours, after which the flask was removed and allowed to cool.

The linear oligomer was prepared by reacting 14.6 g of adipic acid with 14.6 g of hydroquinone diacetate in a similar apparatus. The reaction temperature was raised from 210° C. to 26020 C. over two hours under constant argon flow. After 3 hours at 260° C., the flask was removed from the salt bath and the mixture allowed to cool.

In all cases, the resulting oligomers were removed from the flask, ground into a fine powder, extracted in a soxhlet extractor for 24 hours and dried under a vacuum at 80° C. for 24 hours.

Adhesive Bonds

Adhesive bonds and protective coatings for various metals can be produced from the oligomers described above. The adhesive bonds formed using the oligomers have good mechanical strength at elevated temperatures and are also stable to corrosive environments, including gasses, moisture and solvents.

Thin coatings of the oligomers are made by mixing the oligomeric powders, branched and linear, in the appropriate stoichiometric end group ratio. The mixture may then be spread onto the substrate and heated to an appropriate temperature to induce crosslinking, with the evolution of acetic acid and other volatiles. Heat may, for example, be provided by a furnace or a heated platen. The processing may be carried out under an nitrogen atmosphere, under a vacuum or in air. After heating, the substrate and oligomers are allowed to cool. Alternatively, the oligomeric mixture can be heated to its melting point and the mixture applied to the substrate as a liquid. Then, the mixture may be cured at a temperature higher than the melting point of the mixture.

Adhesive bonds can be formed by taking substrates that have been coated with the oligomeric mixture that has been cured as above and bringing the substrates together so that the cured oligomeric mixtures contact, typically under pressure and at a higher temperature than the curing temperature.

Sample bonds were made using the above-described oligomers and procedure and were tested for lap shear strength. Samples for testing were prepared in accordance with ASTM D 1002 standards. In order to ensure proper bond alignment to produce lap shear joints, samples were aligned in a mold with pins spaced to yield bonds of standard and consistent dimensions. Sam- Example 2

Crosslinked Copolyester Thermostable Foams

A. Thermostable Foam Fabrication

The basic resin which may be used to make thermostable crosslinked copolyester foams (TSF) is a blend of at least two fully aromatic polyester oligomers capable of forming a crosslinkable network. The oligomers may differ slightly in chemical composition and $M_n$ (As used herein, the symbol "$M_n$" shall mean the number average molecular weight). Typically, the crosslinking takes place at temperatures in the range of 270° to 350° C. for about 5 to 60 minutes in a $N_2$ atmosphere or in a vacuum. Acetic acid (AA) evolves as the reaction progresses between oligomers having acid (—COOH) or acetoxy (AcO—) end groups. At the cure temperature, AA diffuses through the resin and serves as a foaming agent.

The best compositions for making crosslinked copolyester thermostable foams consist of four oligomeric components grouped into two sets. Each set contains two fully aromatic oligomers with acid or acetoxy end groups. The first set of oligomers, designated as the H set, typically has a $M_n$ of about 600–800. These oligomers provide for rapid crosslinking and are a main source of the foaming agent, AA. The second set of oligomers, designated the R set, contains branched oligomers with $M_n$ of 1,000 to 2,000. These oligomers provide for foam ductility, end stiffness and strength in the resultant crosslinked copolyester. In general, higher $M_n$ oligomers are slower to react thereby allowing greater latitude in foaming.

Another composition for making crosslinked copolyester foams might consist of a pair of oligomers with $M_n$ between 850 and 2,000, where the first oligomer possesses three acid terminated groups and the other oligomer has a linear backbone with two acetoxy ends groups.

Starting monomers for making the oligomers may include, but are not limited to, trimesic acid (TMA), isophthalic acid (IPA), terephthalic acid (TA), acetoxybenzoic acid (ABA), acetoxynaphthoic acid (ANA), hydroquinone diacetate (HQDA), diacetoxybiphenol (BDPA).

The oligomer synthetic procedure is very similar in all the cases and essentially is a melt copolymerization carried out at about 260°–300° C. under a $N_2$ atmosphere or under a vacuum for 2 to 5 hours.

The blends of oligomers for TSF should contain equimolar ratios of acid and acetoxy end groups so that maximum crosslinking density can be achieved. Typically, the reactive oligomer mixture is homogenized at 200°–220° C. under a N₂ atmosphere with stirring for 5–10 minutes before melt copolymerization is carried out.

For making a low density foam structure an additional foaming agent (for example, azodicarbonamide) might be added. Modification of foam properties could be tailored by varying the molecular weight of the component oligomers and by varying the ratio of H and R-type oligomers.

To fabricate a foam structure, the homogenized mixture is advanced in a preheated mold at about 275°–350° C. under a N₂ atmosphere with stirring for about 10 to 30 minutes. Postcuring under a vacuum at a temperature in range of about 275° to about 350° C. improves the thermal and mechanical properties of the foams.

B. Synthesis of Oligomers

Example 2A

In a typical preparation of an H-type oligomer with three acid terminated groups (TMA/IPA/HQDA/ABA 1:1:1:2, $M_n$ 690), 210 g (1 mole) of TMA, 166 g (1 mole) of IPA, 213.4 g (1.1 moles) of HQDA, 360 g (2 moles) of ABA and 0.95 g (0.1 wt. %) of sodium acetate as catalyst was introduced into a 2,000 ml glass reactor equipped with a N₂ inlet, condenser, mechanical stirrer and controlled heat source. Initially, the reaction mixture was purged by alternating a N₂ atmosphere with a vacuum. Then the mixture was heated to 290° C., with stirring. After about 30 minutes, the temperature was decreased to 270° C., which was maintained over the two and a half hours. A vacuum of about −20 inches of Hg (gauge) was gradually applied at 270° C. for 15 minutes to complete the reaction. After allowing the mixture cool to room temperature, the product was ground into a fine powder.

Example 2B

To make an oligomer of TMA/HQDA/ABA 1:3:1, $M_n$ 730, the procedure of Example 2A was used except that the reactor was charged with 210 g (1 mole) of TMA, 601.4 g (3.1 moles) of HQDA, 180 g (1 mole) of ABA and 1.00 g (0.1 wt. %) of sodium acetate catalyst. The reaction was carried out at 290° C. for 45 minutes and thereafter at 275° C. for about 120 minutes in a nitrogen atmosphere with stirring, and a vacuum was maintained for the last 10 minutes. The final product softened at about 250° C. and was capable of being pulled into threads.

Example 2C

A two-liter glass vessel, equipped with a heating mantel, nitrogen inlet, distilling outlet and mechanical stirrer was charged with 210 g (1 mole) of TMA, 249 g (1.5 moles) of IPA, 407.4 g (2.1 moles) of HQDA, 270 g (1.5 moles) of ABA and 1.15 g (0.1 wt. %) of sodium acetate catalyst. Initially, the reactor was purged by alternating a nitrogen atmosphere with a vacuum, and then the reactor was heat to 290° C. The reaction was carried out at temperature profile of 290° C. for 30 minutes, 275° C. for 2 hours and 285° C. for 2 hours under a N₂ flow of 1 ml/minute with continuous stirring. Acetic acid began to distill off in about 15 minutes and after about one hour about 90% of the theoretical amount of acetic acid was collected. After this time, the mixture was kept at 285° C. under a vacuum with stirring for 10 minutes. The resulting oligomer (TMA/HQDA/IPA/ABA 2:4:3:3, $M_n$ 1,570) had a softening point about 210° C.

Example 2D

The procedure of Example 2A was used except that the reactor was charged with 210 g (1 mole) of TMA, 83 g (0.5 mole) of IPA, 601.4 g (3.1 moles) of HQDA, 180 g (1 mole) of ABA and 1.08 g (0.1 wt. %) of sodium acetate catalyst. The reaction was carried out at 290° C. for 45 minutes and at 275° C. for the subsequent 3 hours under nitrogen with stirring. A vacuum was applied for the last 15 minutes of the three hours. The final product (TMA/IPA/HQDA/ABA 2:1:6:2, $M_n$ 1,510) was a cream colored solid having a softening point about 200° C.

Example 2E

Oligomers with two acetoxy end groups (BPDA/ABA/ANA 1:1:4, $M_n$ 1,070) were synthesized in a manner similar to the syntheses shown in the above examples. Specifically, 283.5 g (1.05 moles) of BPDA, 180 g (1 mole) of ABA, 920 g (4 moles) of ANA and 1.50 g (0.1 wt. %) of sodium acetate catalyst were charged to a 2L glass reactor equipped for melt polymerization. The reaction temperature was slowly increased from 260° C. to 300° C., with stirring under nitrogen for 3 hours. After cooling, the product was ground into a fine powder.

Example 2F

To prepare a TMA/ABA/ANA oligomer in a ratio of 1:1:4 and $M_n$ 1,010 the process in Example 2E was substantially followed except that 210 g (1 mole) of TMA, 180 g (1 mole) of ABA, 920 g (4 moles) of ANA and 1.30 g (0.1 wt. %) of sodium acetate catalyst was added to a 2L reaction vessel equipped for melt polycondensation. The temperature was raised to 290° C. for 30 minutes, then decreased to 275° C. and maintained for about 4 hours.

C. Foam Fabrication

Example 2G

To make a sandwich panel from a R/H 1:2 blended oligomer formulation, a 3.5 by 3.5 by 1 inch aluminum case was placed in a stainless steel mold. A well homogenized powder mixture was prepared from 15.70 g of the oligomer of Example 2C, 15.10 g of the oligomer of Example 2D, 13.80 g of the oligomer of Example 2A and 14.60g of the oligomer of Example 12B. The mold was preheated at 290° C. between a platen, charged evenly with the powdered oligomer mixture and then replaced between the hot platen. After 15 minutes the temperature was decreased to 275° C. and maintained over the next 60 minutes. Within that period, foaming and about 90% crosslinking occurred. Afterwards, a vacuum was applied and the mold was heated at the same temperature for 3 hours. The resulting foam possesses mainly open cells having a cell size in the range of about 5 to about 1 mm, a density of 13 pcf (0.2 g/cc) and a compressive strength of 250 inches of Hg.

Example 2H

The fabrication procedure was substantially followed as in Example 2G and a stoichiometric mixture of 20.02 g of the oligomer of Example 2F and 32.10 g of the oligomer of Example 2E was charged to a preheated mold at 320° C. After 15 minutes a solid foam structure was obtained. To complete the crosslinking reaction, postcuring in a vacuum at 320°–350° C. was carried out for about 10 hours. The resulting foam possessed a density of 9 pcf (0.15 g/cc) and had a cell structure with cells in the range of about 1 to about 3 mm.

Thermo-gravimetric analyses was performed using a TGA Model-2950 TA instrument from DuPont at a heating rate of 10° C./minute in a nitrogen atmosphere or air flow of 60 ml/min. Thermomechanical (TMA) measurements were taken using a TMA Model-2940 TA instrument from DuPont with a nitrogen flow of 50 ml/min. The foam's compression strength was measured using the technique set forth in ASTM C-365.

FIG. 1 is a thenno-gravimetric analysis (TGA) plot showing the weight loss of the foam specimen of Example 2G, heated at 10° C./minute in a nitrogen atmosphere. There is not any change in the foam's weight until about 300° C., and a slight deviation occurs above 350° C.

FIG. 2 represents foam stability at isothermal heating at 300° C. in air. The TGA plot of FIG. 2 shows a change of 5% by weight after 12 hours of the foam of Example 2G.

FIG. 3 demonstrates the mechanical stability at elevated temperatures and under an inert atmosphere of the foam of Example 2G. The TMA plots show that during isothermal treatment at 300° C. under a constant load, the foam specimen has collapsed only 5.5% and it still retains good mechanical characteristics at 350° C. for a short period of time.

Example 3

Crosslinked Copolyester Matrices for Carbon Fiber Composite

Crosslinked Copolyester Matrices in General

Because of their attractive properties, crosslinked aromatic oligomers with reactive terminated groups may also be used as a matrix precursor for carbon fiber (CF) composites. Essentially to achieve fiber impregnation, these oligomers should possess a low melt viscosity in a temperature range below the curing temperature of the mixture of oligomer that is to become the matrix of a CF composite.

Melt copolycondensation is carried out at 260°-290° C. for 2-6 hours under a $N_2$ atmosphere or in vacuum with stirring at 50 rpm. Most of the AA distills off after the first hour but the degree of polymerization at that point is not sufficiently high. The reaction products solidify between 200° and 250° C. and afterwards they are grounded into a fine powder for further use.

To make a composite structure with a copolyester matrix a lay-up molding is utilized. In this method, fabric or tow of C-fiber (Carbon fiber T-300 K12, Thornel, from Amoco) was saturated with premelted oligomeric resin and the desired thickness was obtained using calculations based on fabric contain and specimen volume. The carbon fibers were impregnated at a temperature in the range of about 260° to about 280° C., then the specimen was compacted at contact pressure in the range of about 50 to about 100 inches of Hg. The curing started at these conditions with the evolution of AA vapors. The crosslinking reaction between the oligomers at temperatures in the range of 220°-250° C. is very slow, but at higher temperatures (above 300° C.) voids may be trapped in the matrix. The resin is advanced further at higher temperature and pressure for several hours to form dense structures. The existence of carbon fibers facilitates the release of AA and serves as a support when pressure has been applied. Afterwards, postcuring was done at temperatures in the range of about 300°-350° C. and pressures in the range of about 200°-500 inches of Hg in an inert atmosphere or in a vacuum.

Example 3A

To synthesize an oligomer having TMA/HQDA/IPA/ABA in a ratio of 2:4:3:3 and $M_n$ of 1,570, a two-liter glass vessel equipped with a heating mantel, nitrogen inlet, distilling outlet and mechanical stirrer was charged with 168 g (0.8 moles) of TMA, 310.4 g (1.7 moles) of HQDA, 199.2 g (1.2 moles) of IPA, 216.0 g (1.2 moles) of ABA and 0.90 g (0.1 wt. %) of sodium acetate catalyst. The reactor was purged by alternately introducing a nitrogen atmosphere and then a vacuum and heating the vessel and contents up to 270° C. with stirring. The reaction was carried out at 290° C. for 1 hour under a $N_2$ flow of 1 ml/minute with stirring. Acetic acid began to distill off after about 15 minutes. After an hour approximately 92% of the theoretical mount of AA was collected. Then, the reaction mixture was kept at 280° C. in a vacuum with stirring for 10 minutes. The resulting resin, after cooling, was grounded in to a fine powder. It had a softening point about 200° C.

Example 3B

To form an oligomer from TMA/IPA/HQDA/BPDA/ABA in a ratio of 2:2:1.5:1.5:3 and having a $M_n$ of 1,250 the process of Example 3A was substantially followed except that the reactor was charged with 315 g (1.5 moles) of TMA, 249 g (1.5 moles) of IPA, 405 g (2.25 moles) of ABA, 303.75 g (1.125 moles) of BPDA, 240.56 g (1.24 moles) of HQDA and 1.25 g (0.1 wt. %) of sodium acetate catalyst. The reaction was carried out at the same temperature profile as Example 3A with 450 ml of AA and 22 g of HQDA collected. A yield of 900 g of oligomer was obtained having a softening point between 240° and 250° C.

Example 3C

To form an oligomer from TMA/IPA/HQDA/BPDA/ABA in a ratio of 1:1:2:2:3 and having a $M_n$ of 1,180, the procedure of Example 3A was used except that the reactor was initially charged 405 g (1.5 moles) of BPDA and 465.5 g (1.6 moles) of HQDA, 405 g (2.25 moles) of ABA and 1.28 g (0.1 wt. %) of sodium acetate catalyst, then purged alternately with nitrogen and a vacuum. The reaction mixture was heated up to 250° C. and maintained at that temperature until a clear melt was observed. With stirring and under a nitrogen atmosphere, 157.5 g (0.75 moles) of TMA and 124.5 g (0.75 moles) of IPA were added. The temperature was then increased to 280° C. Meter 30 minutes, at least 90% of AA was collected and the melt was allowed to cool to 260° C. The reaction continued at this temperature for an hour and then the temperature was increased 0.1° C./minute until 280° C. was reached with a vacuum being applied for 10 minutes once the vessel and its contents reached the temperature of 280° C. The resulting viscous resin was allowed to cool and ground into a fine powder. The powder had a softening point about 250° C.

Example 3D

To make an oligomer from HQDA/IPA/ABA in a ratio of 3:2:4 with $M_n$ of 1,150, 64.02 (0.33 moles) of HQDA, 33.20 g (0.2 moles) of IPA, 72.0 g (0.4 moles) of ABA and 0.18 g (0.1 wt. %) of sodium acetate catalyst were combined in a 500 ml glass reactor supplied with a heating mantel, nitrogen inlet, distilling outlet and mechanical stirrer. Initially, the reaction mixture was heated at 260° C. for 2 hours, then the temperature was increased 0.1° C./minute to 280° C. Melt copolycondensation was carried out under a $N_2$ flow of 1 ml/minute with stirring at 50 rpm. After the first hour approximately 95% of the AA was collected and some unreacted HQDA was collected. The reaction mixture was kept at 280° C. under vacuum and stirring for 15 minutes. The product that resulted solidified below 200° C. as a brittle material, which was ground into a fine powder for further use.

Example 3E

To fabricate a CF-composite, 7 g of a stoichiometric mixture of the oligomer of Example 3B and the oligomer of Example 3C was premelted in a metal cavity mold having dimensions 2×1.75×0.5" at 270° C. for 10 minutes. 2.5 g of carbon fibers (T-300, from Amicon), cut in 2" strands, were added to the resin and carefully mixed for 5 minutes to achieve good contact and fiber unidirectional alignment. Next, the mold was closed and a low pressure (100 inches of Hg) applied and the temperature was increased to 290° C. These conditions were maintained for an hour under a nitrogen atmosphere. Afterwards, the temperature was increased to 310° C. with the pressure increased to 250 inches of Hg and a vacuum applied to the mold. After 2 hours, the temperature was increased to 325° C. and the pressure to 350 inches of Hg and held there for 2 more hours under vacuum to achieve a full reaction. The mold was cooled to room temperature under 500 inches of Hg pressure. The resulting composite possessed a density of 1.52 g/cc with a fiber volume fraction of 60%.

Example 3F

The fabrication procedure was substantially followed as in Example 3E except that a well homogenized mixture of 3.14 g of the oligomer of Example 3A and 4.60 g of the oligomer of Example 3D was charged to a preheated mold at 270° C. After 10 minutes, 2.5 g carbon fibers (cut in 2" strands) were added to the resin and carefully mixed to achieve good impregnation. The mold was maintained at 290° C. over the next 4 hours at 100 inches of Hg and under an inert atmosphere. Afterwards, a vacuum was applied and a pressure of 250 inches of Hg was applied to the mold and the temperature was gradually increased to 330° C. for 16 hours. The mold was allowed to cool under a pressure of 500 inches of Hg. The obtained panel had a density of 1.58 g/cc with a fiber volume of about 60%.

Thermo-gravimetric analyses of the composite matrix was performed using a TGA Model-2950 TA instrument from DuPont at a heating rate of 10° C./minute in a nitrogen atmosphere or an air flow of 60 ml/minute. The composite test bars were machined to dimensions of 25.00×10.00×2.00 mm and thermomechanical measurements were taken using a DMA Model-983 TA instruments from DuPont at heating rate of 5° C./minute, amplitude of 0.1 mm, frequency of 1 Hz and a nitrogen flow of 100 ml/minute. Three-point bend testing was done using an Instron MTS Model 1332 at a cross-head speed of 2 mm/minute and span of 25.00 mm. The test specimens were machined to dimensions of 30.00×10.00×2.00 mm.

FIG. 4 is a TGA plot that shows that the composite matrix is stable at high temperatures. For example, the crosslinked matrix has lost only 1.5% of its weight during temperature ramping at 10° C./minute in a nitrogen atmosphere to 450° C.

FIGS. 5 and 6 represent DMA scans showing changes in the CF-composite mechanical properties with respect to temperature. In FIG. 5, a decline of flexural storage modulus at high temperature is shown for three specimens differing in crosslink density of their matrices. This data shows that CF-composites based on crosslinkable aromatic polyester matrices can be successfully used to temperatures of up to 300° C., and the matrices retain at least ⅔ of their good mechanical characteristics at this temperature.

The DMA scan of FIG. 6 demonstrates that composite high temperature performance is not disturbed at isothermal testing at 200° C.

FIG. 7 represents composite flexural behavior of the specimen of Example 3F using a three point bend test (TPBT) at room temperature. The calculated flexural modulus of 85 GPa is fairly close to that measured by the DMA technique. The estimated ultimate flexural strength of 870 MPa is comparable with common values for commercial CF-composites with polymer matrices.

I claim:

1. A method for bonding adherends using a crosslinked copolyester that comprises the steps of:
   a. combining at least one oligomer having carboxylic acid end groups with at least one oligomer having ester end groups, where at least one of the oligomers is branched, to form a crosslinkable mixture;
   b. applying the mixture of oligomers to a portion of at least two adherends;
   c. curing the mixture on the adherends;
   d. positioning the adherends to be bonded such that the cured mixtures contact; and
   e. heating the cured mixture to form a bond.

2. The method of claim 1 wherein the ester end groups of the oligomer having ester end groups are selected from the group consisting of $CH_3CO_2-$, $C_2H_5CO_2-$, $C_6H_5CO_2-$, $(CH_3)_3SiO-$ and $CH_3OCO_2-$.

3. The method of claim 1 wherein the ester end groups are $C_2H_5CO_2-$ end groups.

4. The method of claim 1 wherein the monomers from which the oligomers are made are chosen from hydroxybenzoic acid, hydroxynapthoic acid, hydroquinone, isophthalic acid, terephthalic acid, biphenol, trimesic acid, trimelletic acid, adipic acid, ethylene glycol, hydroquinone diacetate, acetoxybenzoic acid, acetoxynaphthoic acid and diacetoxybiphenol.

5. The method of claim 1 wherein a transesterification catalyst is introduced to at least one surface of the cured mixture on the adherentis.

6. The method of claim 5 wherein the catalyst comprises titanium oxide or aluminum oxide.

* * * * *